United States Patent

[11] 3,551,731

[72] Inventor Joseph W.C. Harpster
Columbus, Ohio

[21] Appl. No. 689,128
[22] Filed Dec. 8, 1967
[45] Patented Dec. 29, 1970
[73] Assignee The Ohio State University
Columbus, Ohio
an Institution of Higher Learning

[54] IMAGE CONVERSION BY A SEMICONDUCTOR JUNCTION ARRAY
15 Claims, 5 Drawing Figs.

[52] U.S. Cl. .......... 315/12, 250/211; 313/66
[51] Int. Cl. .......... H01j 29/41
[50] Field of Search .......... 313/65, 66, 94, 95, 96; 250/211, 211J, 209, 214PHOTO, 214; 178/7.6, 7.7; 315/10, 11

[56] References Cited

UNITED STATES PATENTS

| | | | |
|---|---|---|---|
| 2,959,681 | 11/1960 | Noyce .......... | 250/211 |
| 3,020,438 | 2/1962 | Sziklai .......... | 250/211X |
| 3,058,002 | 10/1962 | Sihvonen .......... | 250/211 |
| 3,087,985 | 4/1963 | Heijne et al. .......... | 315/11X |
| 3,182,198 | 5/1965 | Mahlman .......... | 250/211 |
| 3,322,955 | 5/1967 | Desvignes .......... | 313/66X |
| 3,388,255 | 6/1968 | May .......... | 250/209 |

*Primary Examiner*—Rodney D. Bennett, Jr.
*Assistant Examiner*—Jeffrey P. Morris
*Attorney*—Anthony D. Cennamo

ABSTRACT: The invention is for an image conversion or intensification device utilizing the photovoltaic characteristics of semiconductor junctions and an electron beam scan of the radiation induced voltage.

INVENTOR.
JOSEPH W. C. HARPSTER

BY

ATTORNEY

IMAGE CONVERSION BY A SEMICONDUCTOR JUNCTION ARRAY

BACKGROUND

Solid-state devices have found applications in image panels in a variety of ways in the prior art. However, it has been found that these prior systems or devices have certain limitations. Transistors have been used in display systems without a vidicon or orthicon readout arrangement, but this necessitates the use of extensive complex and expensive switching circuitry. When transistors and diodes are used in this manner they require a connection to each discrete junction and there results a correspondingly poor resolution. Reverse bias junction arrays in matrix arrangements generally produce poor contrast because of the nonuniform reverse leakage currents. The solid-state image tube disclosed in F. W. Reynolds, U.S. Pat. No. 3,011,089, granted Nov. 28, 1961, utilizes the capacitive effect of the P–N junction in a standard vidicon tube. The Reynolds panel, in addition to requiring a means for reverse biasing the junctions, lacks dynamic range because the capacitive variation is much less than the voltage variation for a large amount of radiation excitation. A further limitation of these discrete element semiconductor targets is their restriction to imaging with optical radiation.

SUMMARY OF INVENTION

The invention relates to image conversion or intensification by an electron beam tube consisting of a mosaic array of semiconductor junction devices as the target plate and the other elements associated with conventional television image tubes. The invention utilizes the photovoltaic characteristics of the semiconductive junction and senses the amount of voltage produced at each individual junction in the array thereby obtaining the image pattern which strikes the target plate. Imaging may be by direct or indirect interaction with the tube's target plate, depending upon the depth of penetration of the incident radiation. Indirect interaction is provided by conversion of the radiation to electrons or other ionizing particles which then interact with the mosaic array.

The present invention solves several problems previously existent in the prior art. Reverse biasing of the junctions is not required in the invention, therefore, simplicity of electrical connection, excellent contrast, and high resolution is achieved. Transistor devices are current sensitive and bias dependent, whereas the present invention utilizes the photovoltaic characteristics of semiconductor junctions and is therefore voltage sensitive and not bias dependent. An image panel that is voltage sensitive permits better contrast, wide dynamic range and sensitivity at lower excitation levels than that obtained in prior art systems employing only the capacitive characteristics of semiconductor junctions. An embodiment of the invention is shown which permits imaging by neutron radiation which was unknown to the prior art. The invention can be applied successfully in many fields, nondestructive testing and radiology, for example.

OBJECTS

Accordingly it is a principal object of the invention to provide an improved image conversion device.

Another object of the invention is to provide an image conversion device which produces improved sensitivity.

Another object of the invention is to provide an image conversion device which permits direct or indirect interaction with the tube's target plate by the incident radiation.

A further object of the invention is to provide an image conversion device which permits activation for neutron imaging.

Still a further object of the invention is to provide an image conversion device which produces excellent contrast and resolution with simplicity of circuitry.

For a complete understanding of the invention, together with other objects and advantages thereof, reference may be made to the accompanying drawings, in which:

DETAILED DESCRIPTION OF THE DRAWINGS

Figures 1, 2, 3, 4, 5:
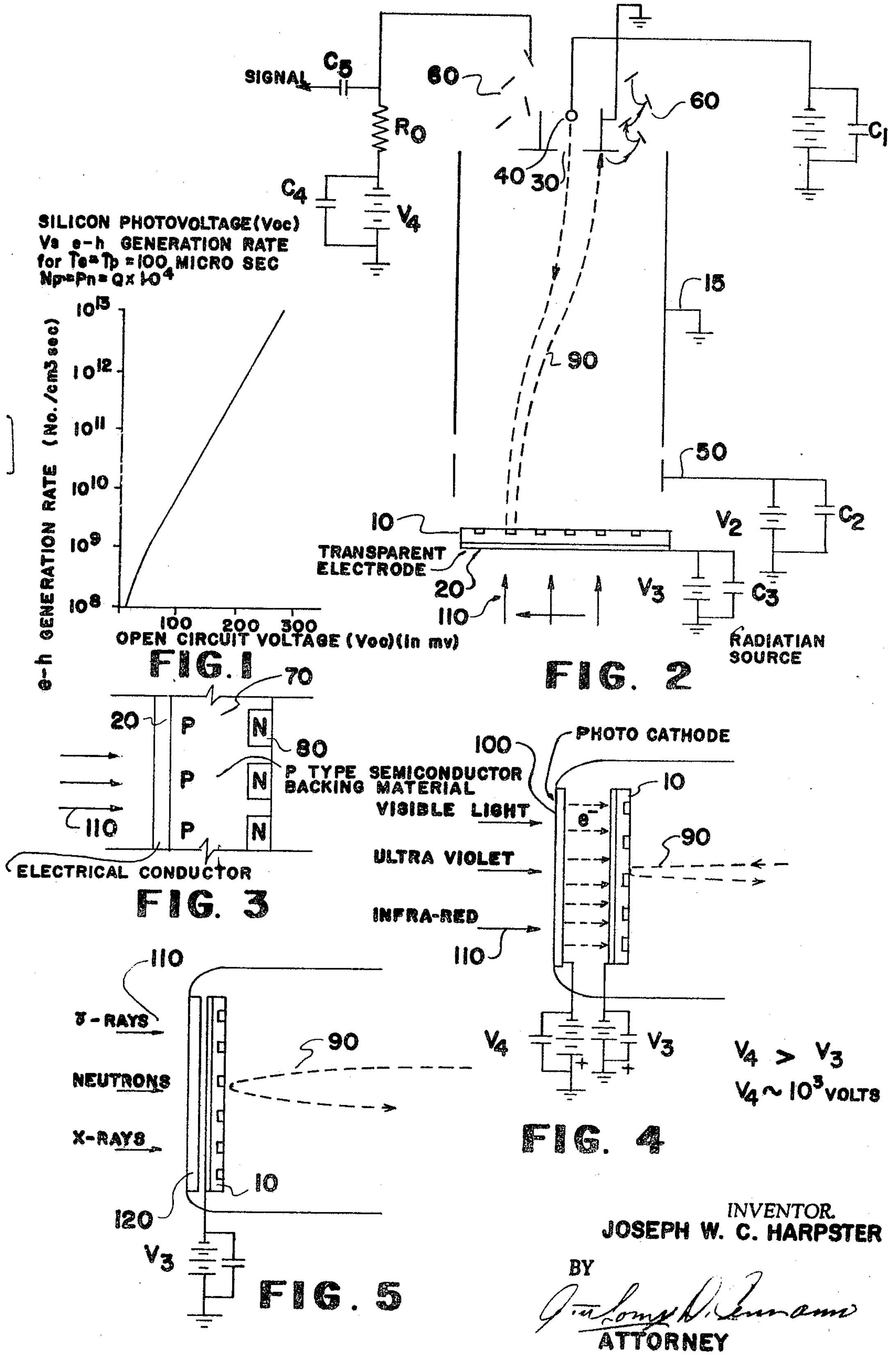
FIG. 1 is a graphical representation of the open circuit voltage across a typical P–N junction as a function of the light intensity incident on the P–N junction.
FIG. 2 represents a preferred embodiment of the invention wherein an image type target is formed for use in a device such as an orthicon television camera tube.
FIG. 3 shows diagrammatically part of the sectional view of the target plate of the tube illustrated in FIG. 2; and, FIGS. 4 and 5 represent alternative embodiments of the invention.

The response of a typical P–N junction utilized as a photovoltaic cell is shown in FIG. 1. As can be seen the open circuit voltage of the P–N junction increases over a wide range proportionally with an increase in the intensity of the light falling upon the junction. This photovoltaic characteristic of P–N junctions and its application to the invention will be more fully described below.

The camera tube shown in FIG. 2 is a preferred embodiment constructed with a target plate 10, the structure of which will be described hereinafter with reference to FIG. 3. Electrical contact with the face of the target plate 10 is made by use of an electrode 20 consisting of a thin, semitransparent, and conductive layer, for example, of metal. Other means of electrical connection to this portion of the target plate may be employed, such as a ring contact. The target plate 10 with the semitransparent electrode 20 is placed in the tube in such a manner that it is opposite an electron gun aperture 30 of the type used in the conventional orthicon television camera, thereby replacing the conventional target plate. This return beam type of camera has a cathode 40, an electron retarding element 50, and an amplifier 60.

The scope of this invention also includes tube configurations in which the signal is obtained at the target plate.

In a direct interaction arrangement as shown in FIG. 2, the source of radiation can be, among others, visible light, X-rays, $\gamma$-rays, $\beta$-rays, and $\alpha$ particles.

FIG. 3 is a sectional view of part of a typical P–N junction target plate. The semitransparent electrode 20 is on the surface of the mosaic array opposite the surface scanned by the electron beam. Each separate element of the array consists of two regions of semiconductive material of opposite conductivity type forming a junction. The bulk or backing layer 70 is illustrated here as P type, and the other element of the junction 80 is illustrated as N type; however, this is a matter of choice.

Construction of the P–N junctions or other photovoltaic structures such as P–I–N or surface barrier junctions can be accomplished in a variety of ways, which are well known to those versed in the art. It is required that the thickness of the radiation incident layer 70 be compatible with the diffusion length of the minority carriers when used for optical imaging or imaging with shallow penetrating radiations.

For purposes of illustration a silicon P–N junction is described but it is not intended by this to limit the scope of the patent to this material or construction.

In operation, when a source of ionizing radiation 110 strikes the target plate 10 there is released in the P zone 70 hole-electron pairs. In P type semiconductive material the electron is the minority carrier and it drifts across the P zone until it reaches the dipole area of the depletion region. At this point the electron is swept across the depletion region to the N zone of the diode causing an excess of electrons in this zone providing a negative potential. When the target plate 10 is scanned by the electron beam 90 emanating from the electron gun aperture 30 this negative potential is sensed by the circuitry of the beam, is amplified, and subsequently displayed on a video screen. The observed photovoltage developed at each junction is a function of local excitation as shown in FIG. 1. In this way the pattern of the image striking the target plate 10 can be obtained. For P regions on an N-type base region the video signal is obtained from the current pulse derived from the removal of radiation induced equilibrium charge.

By proper construction of the diode mosaic, the system should provide excellent resolution (target "grain size" of less than 0.00l in$^2$). The microsecond response to image variation possible with the preferred embodiment is better than that obtainable with any of the prior art image orthicon pickup tubes. With the orthicon tube a very small voltage variation can be measured. For small amounts of radiation excitation the voltage variation in the junction array is much greater than any capacitance variation, thereby providing in a system employing the photovoltaic characteristics of P–N junctions, better sensitivity than that obtained in systems employing only the capacitive characteristics of P–N junctions.

FIG. 4 shows another embodiment of the invention for use with, for example, ultraviolet and infrared sources. A photocathode 100 is placed between the diode mosaic 10 and the incident radiation 110. By applying a uniform potential V4 the radiation produced photoelectrons are accelerated to high energy by the electric field, and upon interaction of these electrons with the array, gain is produced. If, for example, the applied potential V4 is 3.6 Kev., a signal gain of about $10^3$ can be obtained with a silicon target plate 10. However, since the efficiency of the typical photocathode 100 is approximately 10 percent, a total final gain of $10^2$ will be obtained. A limitation of radiation sensitivity in this arrangement would be the photocathode dark current.

When the source of radiation is $\gamma$ rays or X-rays a further embodiment shown in FIG. 5 can be employed. A converter 120, for example, lead, is attached to the face of the target plate 10. The close proximity of the two surfaces is required because of the random dispersion of electrons in the converter 120 when struck by the radiation. These energetic electrons then interact with the diode mosaic in the same manner as described above.

This embodiment also applies to imaging with neutrons. In this instance, the converter layer is made up of a material having a high capture cross section for neutrons (such as $Li^6$ or $B^{10}$). The product particles then interact with the diode array to produce the desired electron-hole pairs.

The flux containing the image information of the object to be measured may be made incident upon either side of the target element, when the electron beam scans the surface an improved collection efficiency is observed because the minority carrier has less opportunity to recombine with a minority carrier of the opposite polarity.

Although certain and specific embodiments have been illustrated, it is to be understood that modifications may be made without departing from the true spirit and scope of the invention.

I claim:

1. An image conversion system including a scanning electron beam, the improvement comprising a target plate including a photovoltaic structure and electrical means of contact with said photovoltaic structure, said target plate arranged in said system wherein said electron beam scans the side of said target plate opposite said means of electrical contact, means for irradiating said target plate on the side of said electrical contact, said irradiation exciting said photovoltaic structure producing an excess potential on said electron beam side of said target plate, said electron beam on scanning said target plate forming a closed electrical path with said photovoltaic structure and said electrical contact, and means for detecting the current variation in said closed electrical path.

2. An image conversion system as set forth in claim 1 wherein said photovoltaic structure comprises a semiconductive material of a first polarity adjacent said electrical contact means and a plurality of discrete semiconductors of a second polarity in contact with said semiconductive material of said first polarity, thereby forming P–N semiconductive junctions.

3. An image conversion system as set forth in claim 1 wherein said photovoltaic structure comprises a P–I–N junction construction.

4. An image conversion system as set forth in claim 1 wherein said photovoltaic structure comprises a surface barrier-I-N junction construction.

5. An image conversion system as set forth in claim 3 wherein said means of irradiation is high energy X-rays.

6. An image conversion system as set forth in claim 3 wherein said means of irradiation is $\beta$ rays.

7. An image conversion system as set forth in claim 3 where said means of irradiation is $\alpha$ rays.

8. An image conversion system as set forth in claim 3 wherein said means of irradiation is $\gamma$ rays.

9. An image conversion system as set forth in claim 3 wherein said means of irradiation is high energy charged particles.

10. An image conversion system as set forth in claim 1 further including a photocathode adjacent to said means of electrical contact, means for irradiating said photocathode, said photocathode producing photoelectrons, and wherein said photoelectrons are given energy by an applied field and which excite said photovoltaic structure.

11. An image conversion system as set forth in claim 10 wherein said means of irradiation is ultraviolet light.

12. An image conversion system as set forth in claim 10 wherein said means of irradiation is infrared light.

13. An image conversion system as set forth in claim 3 further including a converter adjacent to said means of electrical contact and intermediate between said irradiating means and said photovoltaic structure, said converter converting said irradiation of high energy levels to an energy level within the predetermined excitation range of said photovoltaic structure.

14. An image conversion system as set forth in claim 13 wherein said means of irradiation is $\gamma$ rays.

15. An image conversion system as set forth in claim 13 wherein said means of irradiation is neutrons.